(12) United States Patent
Jouan et al.

(10) Patent No.: US 12,492,057 B2
(45) Date of Patent: Dec. 9, 2025

(54) RECEPTACLE WITH INTERNAL CONTAINER SUSPENDED IN AN EXTERNAL POT AND METHOD OF ASSEMBLING THE RECEPTACLE BY AXIALLY PRESSING THE INTERNAL CONTAINER DIRECTLY AGAINST A GLASS NECK OF THE POT

(71) Applicant: POCHET, Clichy (FR)

(72) Inventors: Frédéric Jouan, Moriers (FR); Antoine Del Din, Yaucourt-Bussus (FR)

(73) Assignee: POCHET, Clichy (FR)

( * ) Notice: Subject to any disclaimer, the term of this patent is extended or adjusted under 35 U.S.C. 154(b) by 109 days.

(21) Appl. No.: 18/494,887

(22) Filed: Oct. 26, 2023

(65) Prior Publication Data

US 2024/0140676 A1     May 2, 2024

(30) Foreign Application Priority Data

Oct. 27, 2022   (FR) ...................................... 2211208

(51) Int. Cl.
*B65D 77/04*  (2006.01)
*A45D 40/00*  (2006.01)
(Continued)

(52) U.S. Cl.
CPC ..... *B65D 77/0493* (2013.01); *A45D 40/0068* (2013.01); *B65D 41/04* (2013.01);
(Continued)

(58) Field of Classification Search
CPC ............... B65D 77/0493; B65D 41/04; B65D 43/0231; B65D 51/18; B65D 53/02;
(Continued)

(56) References Cited

U.S. PATENT DOCUMENTS 5,211,299 A * 5/1993 Manfredonia ............ A61J 9/02
215/11.1
8,074,839 B2 * 12/2011 Ronsin ................ B05B 11/0038
215/12.2

(Continued)

FOREIGN PATENT DOCUMENTS

CN        105286268 A      2/2016
ES         1218454 U  * 10/2018   ......... A61B 17/0231
(Continued)

OTHER PUBLICATIONS

English translation of ES 1218454 (Year: 2018).*

(Continued)

*Primary Examiner* — Don M Anderson
*Assistant Examiner* — Eric C Baldrighi
(74) *Attorney, Agent, or Firm* — NIXON & VANDERHYE

(57) ABSTRACT

The refillable receptacle makes it possible to suspend an internal container, formed as one piece, in an external pot made of glass, with the container locked in position by a locking portion mounted from above on an upper annular portion of the container already resting directly on a mounting area that is part of an upper neck of the part which constitutes the pot. The locking portion supports a rotatably movable lid and is detachably mounted to a lateral attachment region provided on the neck, by using an annular clamping member which is fixed relative to the neck and which clamps the upper annular portion from above with downward axial pressure against the mounting area in order to prevent withdrawal of the internal container.

16 Claims, 7 Drawing Sheets

(51) Int. Cl.
   *B65D 41/04* (2006.01)
   *B65D 43/02* (2006.01)
   *B65D 51/18* (2006.01)
   *B65D 53/02* (2006.01)
   *B65D 55/02* (2006.01)

(52) U.S. Cl.
   CPC ......... *B65D 43/0231* (2013.01); *B65D 51/18* (2013.01); *B65D 53/02* (2013.01); *B65D 55/02* (2013.01); *A45D 2040/0018* (2013.01); *A45D 2200/053* (2013.01); *B65D 2251/0018* (2013.01); *B65D 2251/0078* (2013.01); *B65D 2251/205* (2013.01); *B65D 2543/00092* (2013.01); *B65D 2543/00537* (2013.01); *B65D 2543/00564* (2013.01); *B65D 2543/00972* (2013.01)

(58) Field of Classification Search
   CPC ............ B65D 55/02; B65D 2251/0018; B65D 2251/0078; B65D 2251/205; B65D 2543/00092; B65D 2543/00537; B65D 2543/00564; B65D 2543/00972; A45D 40/0068; A45D 2040/0018; A45D 2200/053
   USPC ....................................................... 220/23.89
   See application file for complete search history.

(56) References Cited

U.S. PATENT DOCUMENTS

2018/0235347 A1\* 8/2018 Young ................ A45D 40/0068
2019/0177045 A1\* 6/2019 Schoenmakers ... B65D 43/0212
2022/0021161 A1   1/2022 Demaratos et al.

FOREIGN PATENT DOCUMENTS

| FR | 1573885 A | 7/1969 | |
| FR | 2878835 A1 | 6/2006 | |
| FR | 3056087 A1 \* | 3/2018 | ......... A45D 40/0068 |
| KR | 20210056643 A | 5/2021 | |
| KR | 102270703 B1 | 6/2021 | |
| WO | WO-2018115685 A1 \* | 6/2018 | ......... A45D 40/0068 |
| WO | WO-2021123626 A1 \* | 6/2021 | ............ A45D 34/00 |

OTHER PUBLICATIONS

English translation of FR 3056087 (Year: 2018).\*
English translation of WO 2021123626 (Year: 2021).\*
English translation of WO 2018115685 (Year: 2018).\*
French Search Report for FR2211208 dated May 23, 2023, 8 pages.

\* cited by examiner

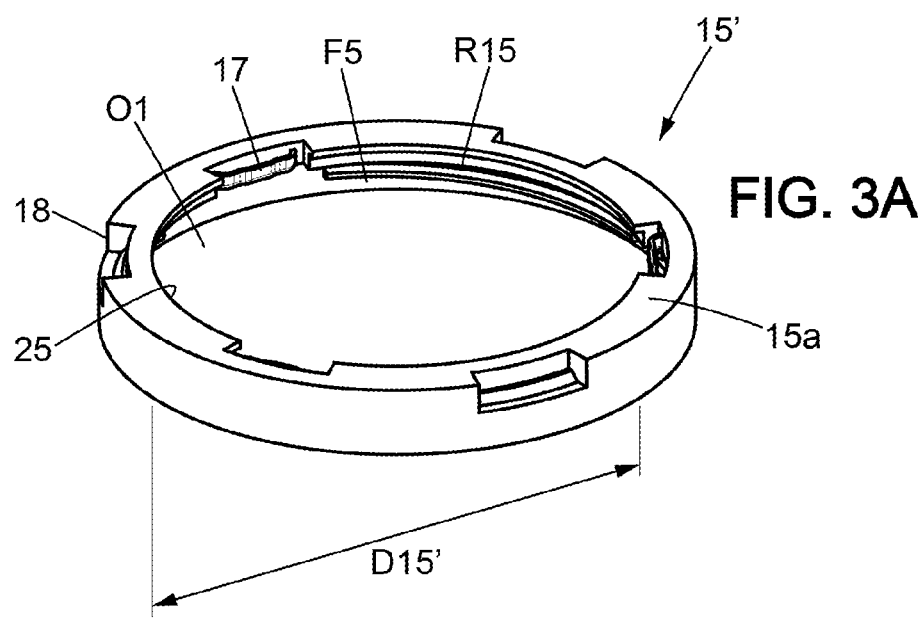
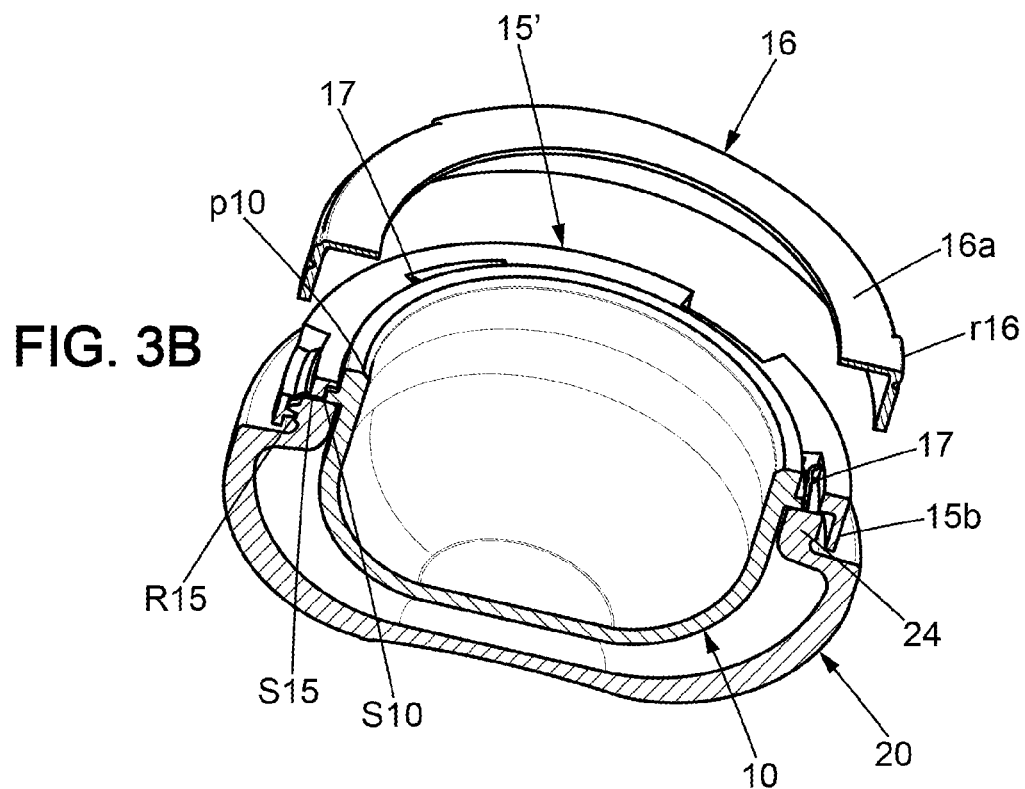

RECEPTACLE WITH INTERNAL CONTAINER SUSPENDED IN AN EXTERNAL POT AND METHOD OF ASSEMBLING THE RECEPTACLE BY AXIALLY PRESSING THE INTERNAL CONTAINER DIRECTLY AGAINST A GLASS NECK OF THE POT

CROSS-REFERENCE TO RELATED APPLICATIONS

This application claims the priority under 35 USC 119(a) of French patent application 2211208 filed on Oct. 27, 2022, the entirety of which is incorporated herein by reference.

TECHNICAL FIELD

The invention relates to the field of packaging receptacles which allow good preservation of the product, in particular a cosmetic or perfumery product, and more particularly the field of receptacles made of inert material such as glass.

The invention relates here to a receptacle which has an internal container used to directly contain the product (for example cosmetic or similar), and an external container typically made of glass which allows internally housing the internal container, this external container combining the functions of covering the receptacle and retaining a lid or closure system. The invention also relates to a method of assembling the receptacle.

TECHNOLOGICAL BACKGROUND

It has long been known, as illustrated by document FR 1573885, to use transparent external coverings, in particular glass, in cosmetic product packaging devices, while receiving the product within an internal container, typically made of plastic. However, the use of a plastic internal container can pose problems of chemical incompatibility with the product to be packaged. Polyethylene and polypropylene are then the only choices for implementing such an internal container. Furthermore, there is a need to reduce the use of disposable plastic containers.

In addition, it would be of particular interest to be able to easily refill the receptacle with product, for example without discarding a plastic container and while minimizing the amount of plastic used to create the interface between the containers. A rigid non-deformable material, typically such as glass, would be preferable because it is more easily reusable (and easily recyclable in the case of glass).

Known from document FR 2878835 A1 are interfaces for assembling an internal container which can be made of glass with a packaging container internally covered with a lining, in order to obtain an assembly for dispensing fluid product which allows refills. However, the type of assembly shown in that document is relatively complex, which limits its application and reduces the possibilities for aesthetic effects; it does not take full advantage of the properties and performance of glass.

Document WO 2021/123626 A1 proposes a robust receptacle, obtained by a mounting solution optimized for the properties and performance of glass, with an assembly requiring beforehand implementation of an attachment on the external container and then a sandwiching of a rim of the internal container.

A disadvantage of this assembly is that the recycling of the external container, which is made of glass, is made a little more tedious by the need to remove a ring mounted on its upper collar. On the other hand, it is easy to remove the internal container which can be replaced.

There is still room for improvements in this type of receptacle, in particular to allow adaptation to a wide variety of non-plastic internal containers (made of inorganic material) while facilitating the operations of refilling the internal container and recycling.

SUMMARY

In order to improve the situation, the invention proposes a refillable receptacle for a product, in particular a cosmetic product, the receptacle comprising at least:
- an external covering pot made of glass, including a side wall extending around a longitudinal axis and an upper neck defining an axial opening for accessing an inside volume of the pot,
- a removable internal container made of inorganic material, preferably glass, created as one piece and intended to be inserted into the inside volume through the axial opening (in a suspended configuration), defining a storage compartment for the cosmetic product,
- a lid adapted to occupy a closed position which allows closing off the axial opening, and
- an annular clamping element for clamping from above, constituting or being part of a locking portion that is detachably fixed to the upper neck so as to prevent removal of the internal container (thus held in the suspended configuration) at least when in the closed position, with the particular feature that the locking portion, secured to the pot, is adapted to axially immobilize the internal container which is typically engaged on the upper neck by seating/being placed in direct contact on a mounting area that is part of the upper neck, with the knowledge that the lid is removably fixed in an annular attachment region formed on at least one among the annular clamping element and the upper neck.

The annular clamping element may be adapted to cover axially, from above, an upper annular portion of the internal container so that the upper annular portion of the internal container is axially sandwiched between a glass edge or rim forming all or part of the mounting area provided on the upper neck and a radial portion of the annular clamping element. Preferably, the radial portion of the annular clamping element is an annular radial portion which extends radially inwards from a main annular body of which the lower end engages, under a flange or rim of the internal container coming into contact with the mounting area, against an attachment region of the neck.

This annular element makes it possible to control the direct/selective axial contact of the pot against the upper annular portion, with downward axial clamping enabled by the attachment/anchoring on the pot.

According to one particular feature, the attachment area for the lid is formed laterally on the receptacle. This attachment may be made possible using an outer skirt of the lid which extends downward from a closing portion.

In the closed position of the lid, the outer skirt of the lid can reach or be flush with a shoulder forming the transition with the upper neck.

The attachment area provided on the receptacle may be formed laterally on the annular clamping element/component, around the neck, to allow the lid to hide the clamping element in a closed position of the receptacle.

Thanks to such arrangements, the internal container (cup) is specifically retained by a clamping component which can be removed before the internal container during disassembly. An axial covering part may be used, forming an intermediate element on which the external lid engages and is immobilized (preferably rotationally), during closure of the pot (closure by the external lid) or before. When the external pot is transparent, this avoids visibility of the insertion parts and/or parts in contact with the external pot, as these can be hidden by the lid.

The axial covering part can be a flange or possibly an annular portion of an interior cap having a radial/closing portion.

The annular clamping element may further be positioned at the same level as a rim or flange of the cup, for dual use of the mounting area, further obtaining a centering effect. The annular clamping element can in fact form, with the mounting area, a shouldered portion having a circumferential delimitation which limits or prevents any radial movement of the internal container. More generally, a difference (discrepancy) in size/diameter between an inside circumference, preferably circular, of the annular clamping element and the outside diameter of the flange of the internal container can be less than the difference between the minimum inside diameter of the neck and the maximum outside diameter of the external side face of the internal container which is facing the neck in the suspended configuration of the internal container.

These arrangements make it possible to avoid frictional contacts (radial contact against the glass of the neck) while concentrating the technical part(s), which may include a sealing lip or a seal, in the area above the internal container. A ferrule, of annular shape and for example made of aluminum or suitable covering material, can cover the technical parts by having the profile of an inverted L.

The locking portion can be detached from the neck in a simple unlocking operation, for example an action of relative rotation between this portion and the external pot, which makes it possible to provide access to the internal container for a refilling operation, for example with the internal container placed directly on the pot and having an external portion that can be grasped by the user.

The external pot, detachable from the rest of the receptacle, cannot—for example unlike the lid—be the first part to be detached. Indeed, it may be required to first remove the clamping component/element, typically after removing the lid, in order to retrieve the internal container and the pot in a stacked configuration, without a retaining clip for the internal container which is then withdrawn via the top.

The external pot may be without any area of contact with the external lid, its skirt surrounding the upper neck (and also an external skirt of the locking portion). The external pot, which is reusable, may be compatible with a packaging unit which includes:
- the internal container and a sealing membrane placed on the upper annular portion, hermetically sealing the opening (the single opening) of the internal container;
- the clamping element, which optionally may be formed as two pieces which are mounted, concentrically, around an outer gripping edge or flange of the internal container.

In this packaging unit, which serves as a support for the lid, the internal container can be the part that is changed, while the clamping element is advantageously reusable as is the external pot.

In some variants, the pot may be clipped on or secured with a rotational movement to only an inner face of the external lid, while the clamping component/element remains secured to and typically embedded in a recess in the lid.

The clamping component/element, axially interposed between the pot and a closing portion of the lid, is configured, in a mounted state obtained by rotationally locking this component, to press axially (downwards) at least one gripping edge or flange of the internal container against the neck or upper attachment ring provided on the external pot.

In preferred options, the clamping component/element allows a refilling operation by its removal, while being adapted to be retained on the internal container in the absence of an external lid, the latter being removably fixed in an annular attachment region formed on this clamping component. The locking portion may consist of such a clamping component, optionally provided with a seal forming a lower contact face against the upper annular end of the cup.

In some embodiments, one or more of the following arrangements may optionally be used:
- the clamping element has dual axial support, resting both on the upper annular portion (for example covering a flange from above) of the internal container and on the mounting area of the external pot/container.
- the lid is able to be locked to prevent its rotation about the longitudinal axis in the annular attachment region.
- the attachment region has one or more reliefs to enable screwing.
- the attachment region has one or more protruding reliefs defining, via the top, a groove area for a bayonet type of attachment.
- the locking portion is adapted to cover the upper neck from the outside, preferably by defining a passage for access to the inside volume while serving as a support for the lid.
- when the locking portion is annular and intended to support the lid, with the attachment region provided laterally on an outer face of the locking portion, the attachment established on the pot by this locking portion is implemented with a radial clamping that is greater than the clamping of the lid against the outer face of the locking portion.
- the lid may surround a part of the annular clamping element which rests (with contact) on top on said mounting area, preferably at a level that is coplanar with the upper annular portion, said part being interposed radially between the upper annular portion of the internal container and a skirt of the lid.
- the part surrounded by the cover allows centering the internal container when the latter is sitting on the mounting area.
- the centering enabled by said part is achieved while maintaining a body of the internal container, which extends downwards from the upper annular portion, radially spaced apart from the glass material of the upper neck.
- a sealing member is provided, interposed axially between the mounting area and a top of the annular clamping element/component, preferably atop the internal container and/or a flange thereof.
- the sealing member, coming into contact, axially from above, both on the upper annular portion and against said part of the annular clamping element, serves to fill in an axial clearance between the internal container and the locking portion, for example in an annular area adjacent to the inner face of the internal container which delimits the compartment for the product.
- the sealing member, which is annular, can be adjusted against an inside circumference of the clamping element.

a sealing member is provided, formed to be integral with the lid.

the annular clamping element constitutes the locking portion.

the locking portion is distinct/separate from the lid and has an annular shape to define an opening for accessing the storage compartment when the lid is absent.

In some embodiments of the receptacle having an annular-shaped locking portion, one or more of the following arrangements may be used:

the annular clamping element constitutes a heterogeneous locking portion, with several parts and/or several materials, possibly having a lower part made of a first material for direct attachment contact with the external pot, and an additional part forming an upper part of the locking portion, which is made of a second material that is more rigid than the first material, possibly metal.

the annular clamping element which constitutes the locking portion includes: a first part having an annular radial portion which extends around the longitudinal axis, resting directly against the upper neck; and a second part forming an annular flange provided with the (annular) radial portion and a lateral portion including an attachment area for attaching the lid.

the annular radial portion of the first part rests against the upper neck, for example from above, presenting an inner face (forming an inside circumference of the first part) which faces a rim or flange of the internal container, the rim or flange being formed in the internal container, optionally in the upper annular portion of the internal container.

the second part is superimposed on the first part and axially covers an upper face of the rim or flange of the internal container.

the second part has a downward projection which extends annularly.

the downward projection is a sealing lip formed as one piece with the annular flange and/or a retaining portion of an attached annular seal, wedged or attached under the second part.

the annular seal rests on top of a delimiting edge, this edge being provided in the upper annular portion of the internal container in order to define a single axial opening for accessing the compartment.

the downward projection of the second part delimits (inwardly) a groove area in which the annular seal is received.

the downward projection protrudes from the annular radial portion of the second part, so that the annular seal extends radially between the downward projection and a lateral portion of the first part which surrounds the upper neck.

the seal is also covered, preferably entirely covered from above, by the annular radial portion of the second part which forms a covering ferrule.

According to one particular feature, the locking portion serves to keep the internal container suspended by using a part having an inverted L-shaped profile. More generally, the locking portion includes a part for which the profile is generally an inverted L, as observed in a longitudinal section view passing through the longitudinal axis, with a lower portion having reliefs on the outer side face which the lid comes to grip. This part is for example in the form of a second part, designed separately from the first part, which is placed/seated on the mounting area. At least the first part may be produced by molding plastic.

Optionally, one or more of the following features are used:

the locking portion is adapted to press the internal container axially downwards and has an external skirt which allows locking a suspended position of the internal container inserted in the external pot, during a relative rotational movement of the locking portion with respect to the external pot when the external skirt is surrounding the upper neck.

the locking portion also has, on an inner face provided on the skirt, centering means provided so as to press the container radially inwards.

the external pot is one piece and the internal container is a cup that is one piece.

each of the parts forming the external pot and the internal container is made of glass.

the part forming an internal container/cup includes a flange or rim portion provided in said upper annular portion.

the annular clamping element is fixedly mounted on the upper neck of the external pot, for example by including a plastic part having an annular portion for gripping this neck.

the annular clamping element is configured to maintain a radial spacing, preferably substantially constant, between the inserted portion of the internal container and the external pot, for example by presenting an inside circumference for contact against and guidance of said flange or rim portion.

According to one particular feature, the annular clamping element has one or more contact reliefs, preferably deformable and with an elastic return effect, projecting radially inwards so as to rest directly against a circumferential area of a flange that is part of the upper annular end/portion of the internal container.

Optionally, this flange is sandwiched axially between the mounting area provided on the upper neck and the (annular) radial portion of the annular clamping element. The annular end portion of the internal container may project axially upwards beyond the flange and beyond the annular clamping element.

In some options, a cap is provided that is capable of selectively closing off the single opening of the internal container. Closure of the cap may optionally result from a rotation, for example using reliefs located on or above the flange. The cap may cooperate with the upper annular portion of the internal container, preferably with reliefs of this upper annular portion which extend above the mounting area, in a configuration where the internal container is inserted into the inside volume.

In addition, for implementations with a cap for the internal container, one or more of the following arrangements may be used:

in one among the external pot and the lid, a cavity or recess is provided to receive the cap.

in the lid, an indentation (accessible from below) is formed for accommodating the cap.

the cap is configured to be integral in rotation with the lid when it is mounted in the indentation/lid recess.

magnetic attachment means are provided so that removal of the lid by detachment/disconnection from the annular attachment region, possibly by a rotational action, simultaneously causes removal of the cap to release the opening (forming an access, typically a single access, for removing the product) from the internal container.

the cap (mounted in the indentation/recess) can be fixed to the internal container in a state that seals the single opening, while being detachable from the lid by traction, exerted selectively on the internal container not inserted in the pot, exceeding a threshold in order to magnetically detach the cap from the lid.

an outside circumference of the cap is non-circular for an anti-rotation effect (in the indentation that is complementary/form-locking).

the cap is inserted into the indentation only by a linear insertion movement, typically with rotational indexing.

the internal container includes an attachment ring provided with reliefs for retaining the cap.

the cap provided in the receptacle is adapted to selectively close off the single opening of the internal container, by engaging with the upper annular portion of the internal container (by screwing, bayonet attachment, or the like), at the reliefs which extend above the mounting area when the internal container is in an insertion configuration in the inside volume.

in the external pot, opposite to the upper neck, a recess or cavity is formed that is defined by the glass of the pot.

the recess or cavity of the pot, the mouth being opposite to the opening for inserting the container, allows accommodating the cap.

the external pot has removable attachment means for attaching the cap, these means engaging an outer side face of the cap and contributing to defining the recess or cavity.

According to another aspect, a refillable receptacle for a cosmetic product is proposed, the receptacle comprising:

an external pot made of inorganic material such as glass, including a side wall extending around a longitudinal axis and an upper neck defining an axial opening for accessing an inside volume of the pot, the upper neck forming an attachment region, for example with reliefs or threads, for attaching a lid that can close off the axial opening, a removable internal container, for example made of inorganic material, preferably glass, optionally produced as one piece, intended to be inserted axially into the inside volume through the axial opening, defining a storage compartment for the cosmetic product, and a closing cap for closing off an upper opening of the internal container, with the particular feature that the internal container has an annular upper end which:

defines said upper opening, preferably the only one, of the internal container; and protrudes axially beyond said annular interface through an opening of the annular interface, presenting an attachment portion on an outer lateral portion of the upper annular end, for attaching the cap, with the knowledge that the external pot includes an indented annular base to accommodate and allow removable attachment of the closing cap. This base defines for example a recess, preferably accessible axially from below.

This allows the internal container to be used in a closed configuration for portable use (travelling) without the external covering pot and typically without the main lid, with a reduction in size. The fact that the cap is housed and for example hid in the lower portion makes it possible to avoid interference during operations of opening and closing the receptacle with the external covering pot. Simply removing a lid attached to this pot is sufficient (a single operation) to access the top of the internal container. If the cover seal, if any, is no longer present because it was removed at first use, the contents are therefore easily accessible.

According to one particular feature, the cap is fixed by a male portion inserting into the female portion formed by the indented annular base.

The internal container is kept suspended in the external pot by the direct axial contact on the neck. Optionally, the internal container is prevented from rotation by the use of reliefs directly formed near a flange of the internal container. An annular interface, which cooperates with the upper neck by establishing a removable attachment, may further be used to prevent removal of the internal container.

According to one variant, a refillable device for a cosmetic product is proposed, having a receptacle of the aforementioned type and a lid, but which may not have a recess to accommodate the cap on the bottom of the external pot. The cap associated with the internal container is able to fill a female cavity formed in the lid (recess in the lid) so as to make the cap integral in rotation with the lid, the cap having for example an outer side face of non-circular section. This makes it possible to activate the opening and closing of the lid (which houses and retains the cap internally) while simultaneously attaching, for example by screwing, the cap on the attachment portion which is accessible, above the upper neck of the pot.

According to one particular feature, the lid and the cap further present one or more magnetic attachment members which resist/prevent an axial removal of the cap (by the bottom of the lid) due to magnetic attraction. Optionally, magnetic members incorporated in the cap are spread/distributed over a peripheral area of the cap, for example in bulges or lobes formed as projections protruding radially outwards.

Optionally, the flange of the internal container carries reliefs (recessed and/or projecting), preferably on an outer face defining an outside circumference of the flange, in order to retain the cap by engaging with the inner face of a skirt of this cap.

Additionally or alternatively, all or part of the reliefs of the internal container for retaining the cap are provided above the flange.

When the cap is fixed by magnetic attraction to the lid while occupying a recess in the lid, traction exerted on the internal container beyond a threshold while keeping the lid fixed, in the fixed/locked state of the cap, may be sufficient to detach the cap from the lid. It is thus possible to retrieve a nomadic travel-size packaging unit which groups only the internal container and its cap.

According to one particular aspect, use of an internal container as a refill/replaceable unit of the receptacle as mentioned above is proposed, the locking portion being removable relative to the external pot and allowing, in a state where this portion is fixed to the external pot, defining a radially interior groove or attachment area adjacent to the upper neck, whereby the internal container—provided with a flange or edge in its upper annular portion—is adapted so that the flange or edge fills the groove or attachment area, preferably under a seal (O-ring or possibly in the form of a disc and integral with a cap and/or lid). The flange can thus engage (at least by axial pressure) with a locking portion which may be arranged in tiers to support pressures from above, in particular so as to come into contact with both the top of the flange and the top of the mounting area. When a seal is integrated into the top of the flange, a sealing assembly is formed for fluidtightness between the exterior of the receptacle and the interior where the product is located, so that the flange supports/is covered by a seal integrated into the locking portion.

With this arrangement, it is possible, for example, to use a compact internal container with no portion protruding beyond the flange, while still enabling a sealed annular contact area to be established.

Optionally, the internal container cooperates with a cap in a nomadic use requiring neither the external pot nor the lid, the cap being accommodated within a recess or cavity of the external pot which has its mouth axially opposite the opening for accessing the inside volume.

According to another aspect, a method of assembly of a receptacle is proposed, for example a receptacle as presented above, by mounting an internal container, typically formed as one piece of inorganic material, in an external pot made of glass, preferably transparent, the method successively comprising:

inserting the internal container into an inside volume of the external pot through a longitudinal opening of the external pot, so that the internal container is positioned with direct contact on a mounting area that belongs to an upper neck of the part/piece that constitutes the external pot;
  coupling a locking portion around the upper neck of the external pot, by removable attachment means, so that in the fastened state of the locking portion, an annular clamping element which constitutes or is part of a locking portion and which is fixed relative to the upper neck clamps from above an upper annular portion of the internal container with downward axial pressure against the mounting area so as to prevent removal of the internal container;

with the knowledge that after mounting by relative rotation with respect to the external pot, a lid allows obtaining a closed position of the receptacle by surrounding the annular clamping element, whereby said upper annular portion of the internal container is axially sandwiched between a glass edge or rim forming all or part of the mounting area provided on the upper neck, and a radial portion of the annular clamping element which is distinct from the lid.

Optionally, a part of the clamping element can be fixedly coupled in a position where it axially covers from above the upper end/neck of the pot, enabling detachable attachment relative to the pot, in a gripping area that is offset radially outwards relative to an axial contact area defined between at least one gripping edge or flange (external) of the upper annular portion and a lower contact face that is part of the radial portion.

In the assembly method, centering the internal container in the external pot can be carried out during the mounting and/or formation of the locking portion, by:

an adjustment in position between an inner face of a side wall element included in a flange/upper part (second part) and an opposing wall of a lower part (first part) surrounded by the inner face; and
  guidance by the flange/upper part of a flange or follower projection formed on said upper annular portion/end, the flange or follower projection preferably protruding radially outwards.

BRIEF DESCRIPTION OF DRAWINGS

Other features, details, and advantages will become apparent upon reading the detailed description below, and upon analyzing the appended drawings, in which:

FIG. 3A is a perspective view showing an annular piece, intended for contact with the internal and external containers, which can constitute a component of a locking portion or ferrule, in an embodiment option that is compatible with radial clamping exerted on an outer circumference of the portion of the internal container which protrudes from the top of the external pot;

FIG. 3B is a perspective section view of a receptacle without the lid, with an annular flange disassembled/separated for the purposes of illustrating the radial clamping contact between the clamping component shown in FIG. 3A, provided in the locking portion, and a flange of the internal container.

DESCRIPTION OF EMBODIMENTS

Figure 1:
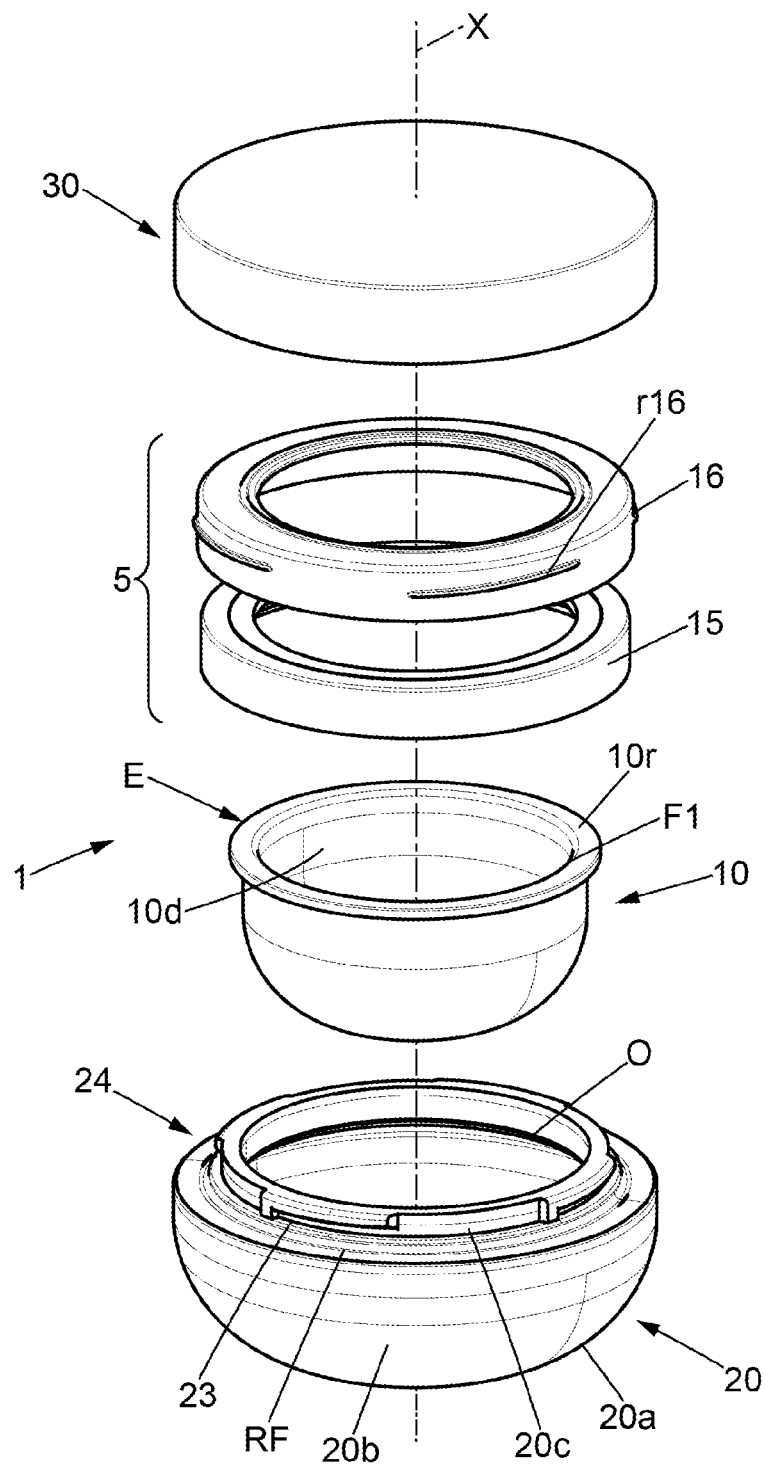
FIG. 1 is an exploded perspective view of a receptacle according to one embodiment of the invention, which allows installing an internal container within the inside volume of an external container/pot in a stable and removable manner, in a manner compatible with the repeated use of a lid for opening and closing off access to the product contained in the internal container.
Figure 4:
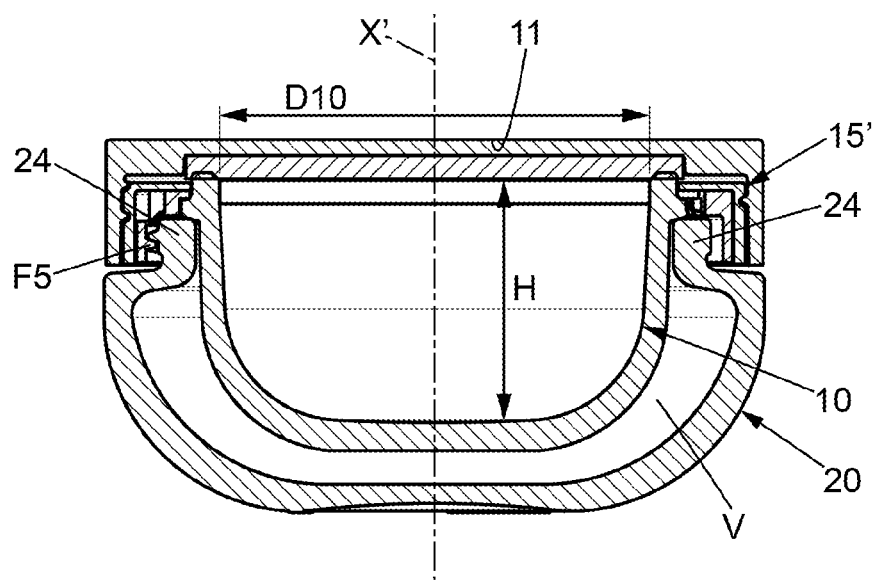
FIG. 4 is a longitudinal/vertical section view, illustrating a receptacle 1 before it is closed by a lid, in an assembled state of the components with the annular flange permanently attached, possibly by elastic interlocking and/or gluing, to the ferrule component which enables attachment to the neck of the external pot.
Figure 6A:
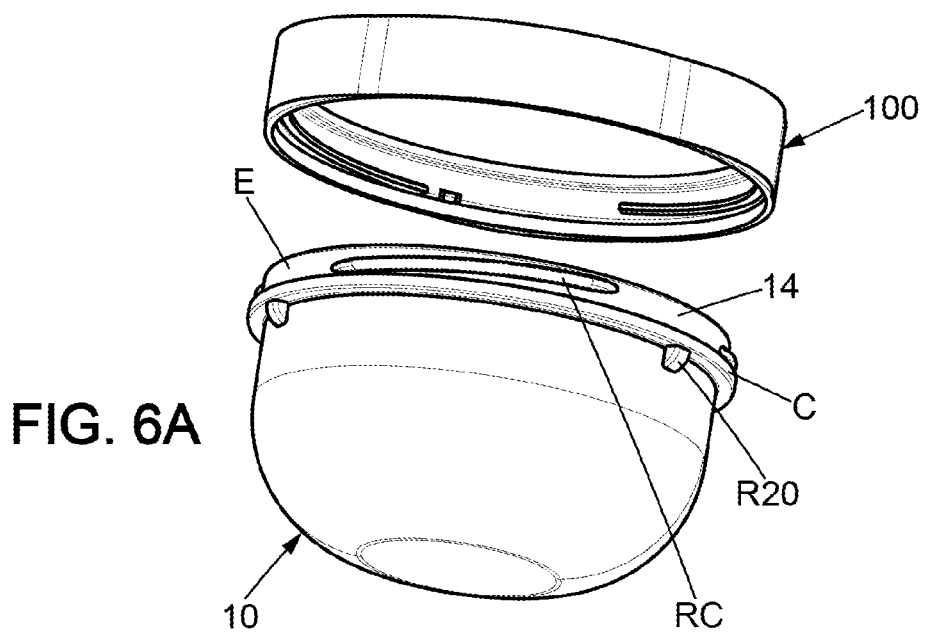
FIG. 6A is a perspective view from below of an internal container integrating anti-rotation means, for example near a flange which may further have attachment members for attaching a clamping component which can serve as a cap specifically for nomadic use of the internal container.
Figure 6B:
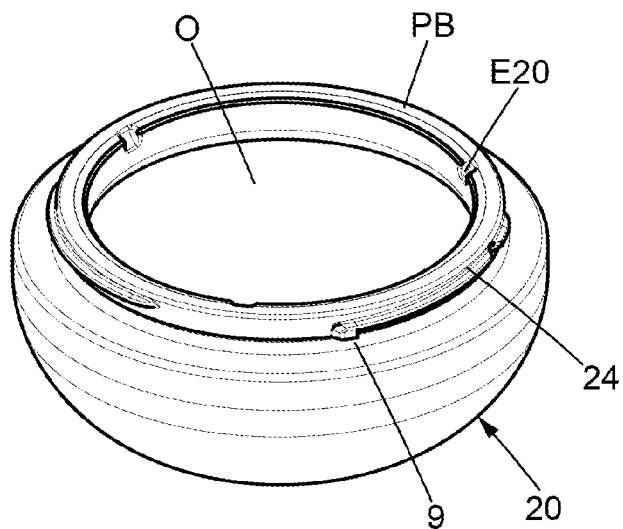
FIG. 6B is a perspective view showing the top of a bottle or pot forming the external container, in an embodiment of the invention compatible with the use of an internal container having anti-rotation means, for example such as the one illustrated in FIG. 6A.
Figure 6C:
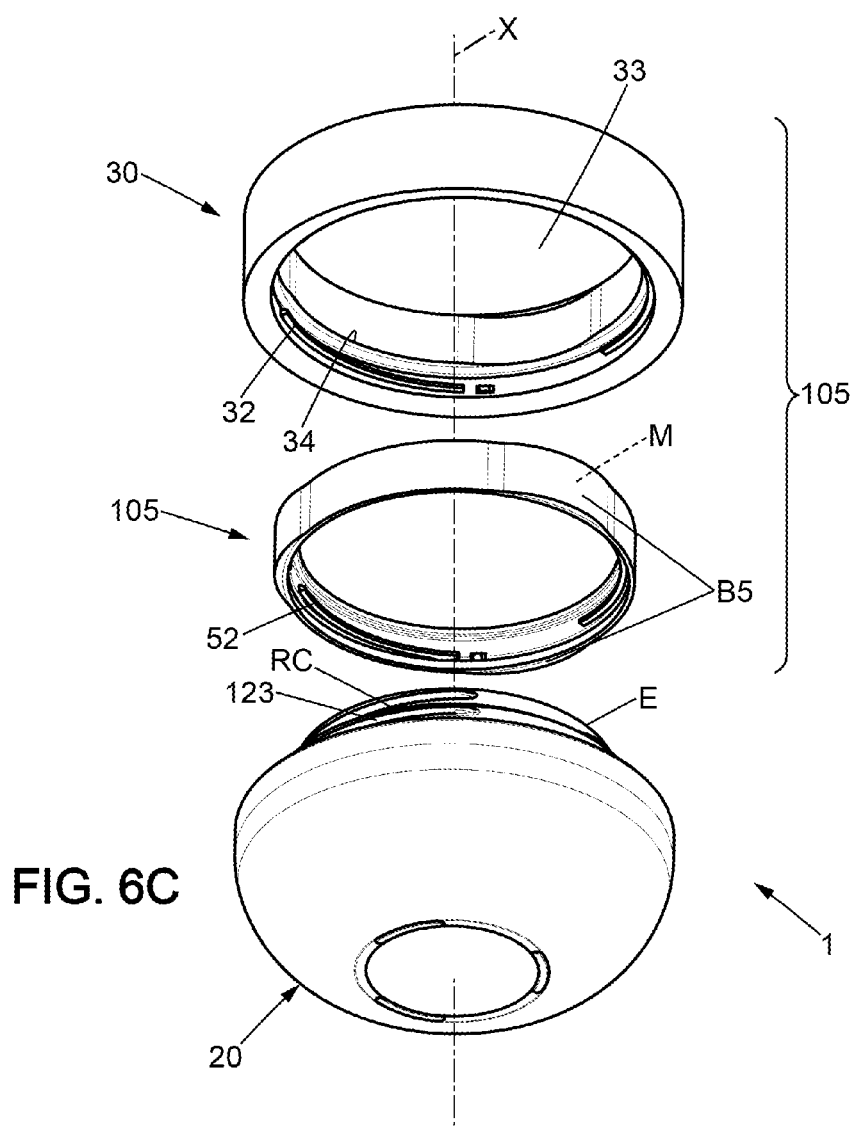
FIG. 6C is an exploded perspective view of a receptacle combining the parts shown in FIGS. 6A and 6B, as well as a lid which is able to be secured to and to cooperate functionally with the clamping component for operations of locking/unlocking the internal container.

With reference to FIGS. 1, 4, and 6C, one can see examples of a receptacle 1 which makes it possible to position and maintain an internal container 10 on the neck 24 of a covering container referred to in the following as external pot 2. This is made possible by a locking portion 5 or 105 having:

a lower anchoring end for attachment on neck 24, for example implemented in the form of a skirt, and an axial covering portion for covering of an annular upper end (circular, oval, polygonal, or other) of internal container 10, referred to in the following as upper annular portion E.

Locking portion 5 or 105 is removably fixed on neck 24, for example by attachment means which allow mounting by relative rotation between locking portion 5, 105 and neck 24 and/or by using a deformable member for a clipping action which locks the position of locking portion 5, 105.

Unlocking is possible, for example from the effect of selectively rotating locking portion 5, 105 relative to attachment region RF provided on neck 24. For such unlocking, a user can grasp a grippable portion of the locking portion which surrounds neck 24. Optionally, the grippable portion constitutes a side face adjacent to a shoulder of external pot 2 and making it possible to removably mount a lid 30. Neck 24 can be surrounded by such a lid 30, which is mounted for example by screwing or a bayonet type attachment, either directly on attachment region RF provided laterally on this neck, or indirectly by attaching to an annular interface integral to neck 24. In all cases, it is possible to free the neck 24 by detaching the lid and the possible annular interface, which facilitates the recycling of external pot 20.

In the figures, the respective axes X and X' of internal container 10 and external container 20 are positioned vertically. Containers 10, 20 are separate and can therefore be designed separately. In the figures, the up and down direction is defined according to the direction of the longitudinal axes, so that the widthwise direction of receptacle 1 is a radial direction and the heightwise direction of receptacle 1 or of one of its components is a longitudinal direction.

Referring to FIGS. 1, 3B, 4, and 5, a reservoir for product is provided as a single piece, formed by internal container 10 which is made of rigid inert inorganic material. The glass typically used to form external container 20 is for example obtained from silica and typically transparent or translucent. The glass or other rigid inorganic material of internal container 10 and of external container 20 may be identical or different, internal container 10 possibly being opaque in certain options. The material of internal container 10 is well suited for forming a chemically inert material (without interior coating or lacquering), allowing contact that is compatible with long preservation of a product 2 poured/deposited in internal container 10, as can be seen as a non-limiting example in FIG. 5.

Internal Container

Figure 5:
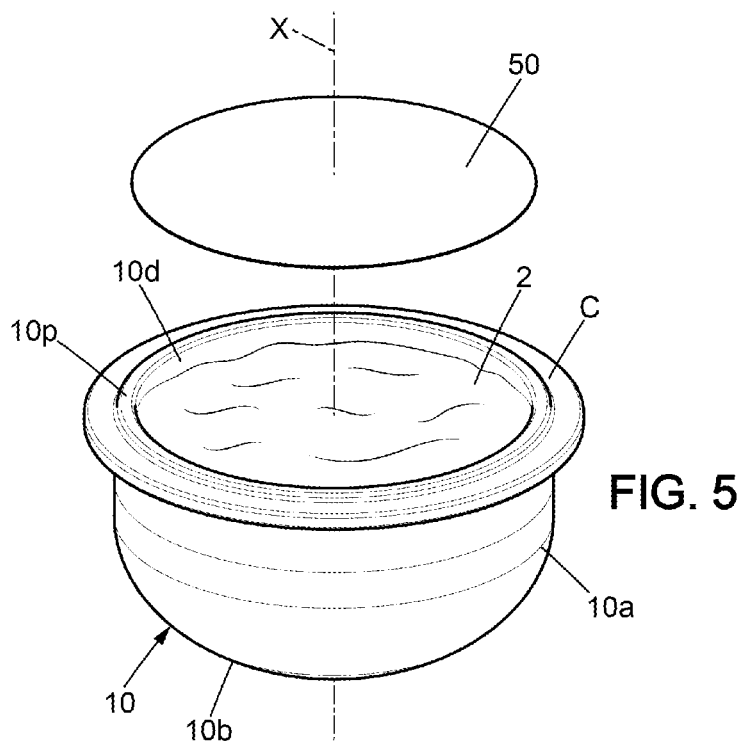
FIG. 5 is a perspective view illustrating an example of an internal container filled with a product, before a step of sealing with a cover seal.

As in the case illustrated in FIG. 5, internal container 10, also called a cup, can have a tubular side wall 10a which extends around longitudinal axis X between a bottom wall 10b, for example having a flat or rounded bottom (to form a convex bottom bulging downwards), and a continuous flange or flange C which defines an axial upper face F1 or annular free edge surrounding a single opening 10d of internal container 10. The cross-section (horizontal) of side wall 10a may be circular or oval, without this being limiting. In some variants, flange C or a similar rim 10r forming a peripheral upper face F1 is offset slightly downwards relative to the plane of opening 10d. Internal container 10 may consist essentially of a body made of glass or similar inorganic material, this body (10a, 10b) being supplemented by flange C or edge/rim 10r protruding radially outwards relative to side wall 10a. In the following, flange C (or edge 10r) is made from the material of the body, and thus may be made of glass.

The receiving volume or compartment (corresponding to a single cavity here) of internal container 10 can be adapted to store product 2, a cosmetic, pharmaceutical, or other product which typically is fluid, semi-fluid, or pasty, inside external container 20. In certain options, edge 10r may be non-circular or non-continuous, or possibly replaced by at least two separate gripping edges which each protrude radially outwards in different and/or substantially opposite directions.

Although the drawings show a single compartment for receiving product 2, it may be provided that a longitudinal separating wall connecting two different regions of the inner face of side wall 10a is formed, in order to form at least two separate compartments within internal container 10.

Figure 7:
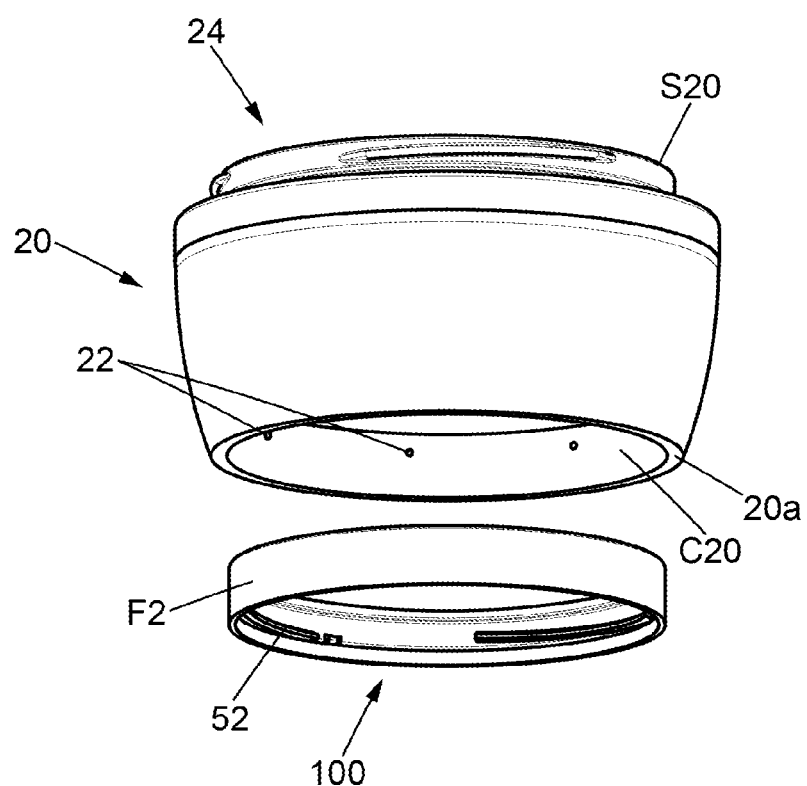
FIG. 7 is a perspective view from below of an external pot provided with a recess for accommodating a cap which allows closing off the single opening of the internal container mounted in the external pot.

Referring to FIG. 4, the width or outside diameter at half height of internal container 10 may be at least equal to 90% or 100% of inside diameter D10 of opening 10d of container 10, in order to optimize the capacity of internal container 10 and thus minimize the inter-container separation space, which corresponds to an annular volume not intended to receive any content in most of the applications envisaged. In addition, height H of internal container 10 may represent more than 85 or 90% of the total height of external container 20. In the case of FIG. 7, this ratio may possibly be reduced, due to the presence of a recess or cavity C20 which allows accommodating a cap 100 adapted for coupling to upper annular end E of internal container 10.

Optionally, on the upper face formed by edge/rim 10r, an annular projection 10p protruding axially upwards is formed, for example in the axial extension of the inner face defining the volume/compartment for receiving product 2. Face 10r can then be divided into a protruding portion corresponding to annular projection 10p and a peripheral upper face/portion 10r, here included in flange C, and which can be substantially planar.

Figure 2A:
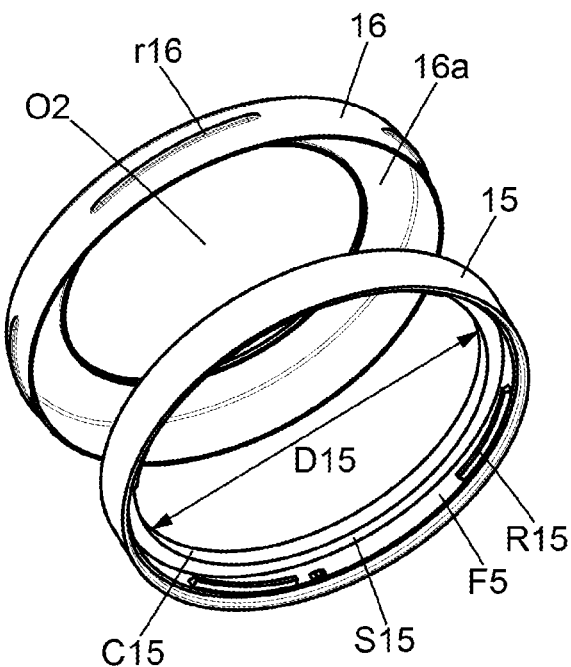
FIG. 2A is an exploded perspective view of an example of a ferrule that can form the locking portion of the receptacle of FIG. 1, with a removable attachment area allowing detachment of the ferrule in order to separate the internal container from the external pot.
Figure 2B:
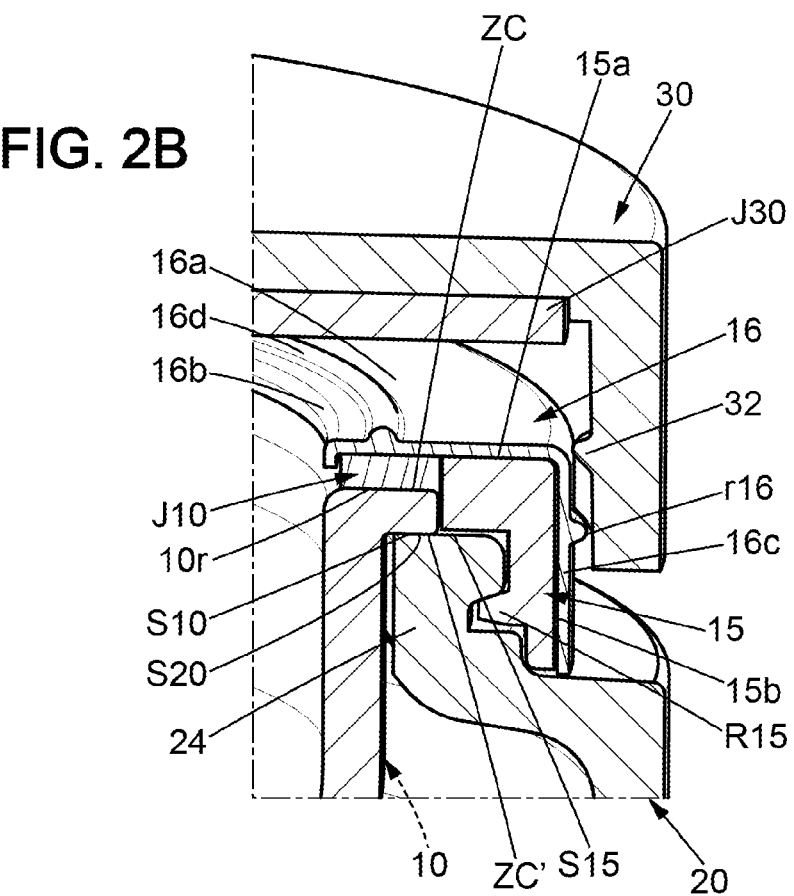
FIG. 2B is a longitudinal/vertical sectional view, illustrating details of the receptacle of FIG. 1 in an assembled state (with, as in FIG. 1, the product and a possible cover seal omitted), just before it is closed off by the attached lid, with a flange of the internal container interposed axially between the top of the neck of the pot and a locking portion having several fluidtight contact surfaces.

As can be seen in FIG. 2B, upper face F1, here flat and annular, can define a seat area ZC (area of direct contact) to support a seal J10 clamped or wedged by the use of a clamping component 5. Seal J10 may optionally be part of the component or be sandwiched and caught between two assembled parts to form clamping component 5.

Opposite to this flat annular upper face F1, flange C defines an annular lower surface S10, possibly flat, also intended to form an axial contact area ZC', for example annular, but this time between flange C and a mounting surface S20 provided on external container 20. In other words, flange C can constitute a portion clasped axially between two parts, one of which is rigid/non-deformable (the glass of external pot 20 forming surface S20). More generally, this type of clasping is obtained with at least one gripping edge such as a flange C, which is an integral part of internal container 10.

It is understood that annular projection 10p can form a barrier preventing product 2 from laterally reaching a plastic or aluminum part in the covering/sandwiching area of flange C. This thus reduces the risk of product 2 coming into direct contact with the material of the peripheral/annular interface portion surrounding neck 24.

In this example, container 10 consists of body (10a, 10b) forming a reservoir portion, and flange C. The height of flange C is reduced, for example not exceeding 7 or 12 mm, and preferably less than or equal to 4 mm. The amount of material of the clamping component surrounding end E can be reduced by limiting the dimensions (radial extension and/or thickness) of flange C. The radial extension of flange C can be greater than or equal to the height of lateral portion 16*c* of clamping component 5, without exceeding for example 7 or 12 mm. The use of a flange C facilitates manipulations for high-speed assembly, by forming a grip and by limiting frictional stresses (radial friction) in particular against the inner face of neck 24.

In certain options, flange C of internal container 10 carries reliefs RC (recessed and/or projecting). As can be seen for example in FIG. 6A, such reliefs RC may be formed on an outer face defining an outside circumference of flange C. This arrangement allows retaining a cap 100, 105 which may be either a cap selectively coupled to internal container 10, or an attachment portion implemented as a sub-portion of lid 30 (lid which engages with neck 24 or an annular interface surrounding the neck in the open state of receptacle 1) which covers opening 10*d* of the internal container.

Preferably, a cap 100, 105 which is separate/separable from lid 30 is provided with a skirt forming an outer side face F2. Reliefs RC make it possible to retain cap 100, 105 by engaging with the inner face of the skirt of cap 100 or 105. Attachment reliefs 52 provided in cap 100, 105 may be annular reliefs or threads distributed on the circumference of the skirt with spacing between them, these attachment reliefs preferably being less than or equal to 5 or 6 mm in height. This optimizes the height of cap 100, 105 and also of the glass or similar inorganic material provided outside the inside volume, in the mounted position of receptacle 1.

It is understood that the upper annular portion or end of internal container 10 is provided with a gripping rim or a flange C to allow internal container 10 to be held in suspension within inside volume V, by engaging on upper neck 24 of external pot 20 which is described below. Axial mounting on pot 20 with a flange C or similar edge may be permitted, for example by providing a relatively large inside diameter D10 for opening 10*d*, for example greater than 44 mm and/or representing more than 90% of the inside diameter of opening O through which container 10 is inserted into pot 2.

External Container

As reflected in the examples illustrated in FIGS. 1, 2B, 3B, 4, 6B-BC, and 7, external container/pot 20 has an inside volume V accessible through a longitudinal opening O defined by a neck 24. This type of neck 24 (or receiving member) forms all or part of upper end 24 of external pot 20 and makes it possible to mount a lid 30, directly or via a clamping component 5, 105 surrounding neck 24, in order to obtain a coupling state in which upper end/portion E of internal container 10 is axially fixed relative to external pot 20.

External pot 20 has a bottom 20*a* and a side wall 20*b* which extends longitudinally around an axis X', up to annular neck 24, as can be seen in particular in FIG. 1. Longitudinal opening O can be relatively wide to allow the passage of an insertion portion of internal container 10. Such an insertion portion typically corresponds to the portion of internal container 10 located under flange C or under the corresponding upper face 10*r*.

Referring to FIGS. 1, 2B, and 3B, an external shoulder of pot 20 can separate/make the transition between the side wall 20*b* and the annular neck 24. In this example, the neck 24 does not provide the function of direct attachment of a lid 30. Although the figures show a neck 24 reducing the cross-section of the interior cavity forming volume V, in other options it is possible to provide a neck 24 which extends the inner face of side wall 20*b* axially only.

The upper end which forms neck 24 is provided with removable attachment means for securing locking portion 5 or possibly directly lid 30 to the upper end. In all cases, clamping component 5, 105 is prevented from movement by such attachment means which make it possible to lock the coupling state of the component by a rotational action, for example by screwing or by a bayonet type of connection.

FIG. 1 illustrates the case of an annular neck 24 which for example has recesses 20*c* which are at least two in number so as to form guides for a bayonet attachment. Each recess 20*c* is open axially at the top. Two edges or sides, which laterally define this recess 20*c*, can be formed by protruding ribs 23.

In the non-limiting case of FIGS. 1 and 2A-2B, attachment region RF corresponds to a groove area where the reliefs and/or lugs R15 provided on clamping component 5 are accommodated. Of course, this arrangement is applicable regardless of the geometry adopted for the exterior portion of the clamping component and independently of the exact shape used for upper annular portion E of the internal container 10.

In the variant proposed in FIG. 6C, lid 30 can engage directly with a thread or comparable reliefs 123, provided on neck 24, by a relative rotational action between lid 30 and external pot 20. Independently of the method of attachment around neck 24, it is optionally allowed to prevent the rotation of internal container 10 by anti-rotation means integrated into neck 24, preferably on an inner face of neck 24. This anti-rotation effect can be obtained by the cooperation of a pin or a relief which engages a corresponding notch/cavity/recess, making it possible to form a gripping edge. Rotational indexing is then provided when inserting internal container 10 into external pot 20.

In FIGS. 6A and 6B, it is provided to use one or more recesses or notches E20, for example opening both axially upward and laterally in the inner face of upper neck 24. Lugs R20 provided on internal container 10, possibly adjacent to flange C, can each be inserted selectively into a corresponding notch E20. More generally, it is understood that such recesses, notches E20, as well as reliefs protruding radially (inwards) from neck 24 are, in practice, hidden when internal container 10 is in the inserted configuration, as can be seen for example in FIG. 6C. Lugs R20, when positioned under flange C, are also hidden.

This arrangement with its anti-rotation effect is applicable to any embodiment, including those illustrated. Notches E20 may be replaced and/or supplemented by at least two interior elongate ribs parallel to axis X', formed for example on neck 20 near the mounting area during the molding of pot 20.

Optionally, the mounting surface or area S20 for neck 24 may be adjacent to an annular interior edge and at a distance from the annular exterior edge. In this manner, it is possible to leave space for the exterior of clamping component 5 to engage with a (peripheral) surface portion of the free edge or the rim of portion E which remains available, on the exterior relative to flange C, as is clearly visible for example in FIG. 2B.

Furthermore, as in the case of FIG. 6B in particular, a beveled portion PB may be provided at or near the connection between:
  mounting area S20, substantially flat and perpendicular to axis X' of the pot,
  and the inner face of upper neck 24, which can be vertical/parallel to axis X' with no slope.

This beveled portion facilitates direct insertion of internal container 10 into inside volume V while leaving a large radial extension for mounting area S20. As a non-limiting example, the minimum radial extension of mounting area S20 can be greater than or equal to 4 mm. The radial extension of possible beveled portion PB can be less than 1.6 mm or even less than or equal to 1.2 mm.

Although the drawings show inside volume V of external pot 20 having a depth corresponding substantially to the total height of internal container 10, other housing arrangements for fully or partially receiving internal container 10 within inside volume V can be considered. More generally, height H (visible for example in FIG. 4) of internal container 10 can vary, even if it may be preferred—for reasons of space and optimized filling with product 2 compared to the overall size of receptacle 1—to limit the difference in height between containers 10 and 20 to less than 20 or 25 mm. It is also possible to place the top of internal container 10 at least more than 2 or 6 mm higher than the level of longitudinal opening O of external pot 20, preferably without protruding by more than 8 or 10 mm for example.

Option with Embedded Cap

Side wall 20b of external pot 20 typically defines an inside volume V sufficient to accommodate internal container 10 while utilizing most of its height. In some options, however, a fraction of the height of pot 20 is reserved for defining a sub-compartment placed under the inside volume V. Referring to FIG. 7, a recess or cavity C20 is provided opposite to upper neck 24, with its mouth opening axially downward. Cavity C20 here allows housing the cap 100 used to close off opening 10d of internal container 10, for example in a manner where it is hidden by a lower annular portion of side wall 20b.

To allow removable attachment of cap 100, the glass or a coating/treatment provided on the glass, may optionally form local irregularities or reliefs 22 and/or indentations. These elements/reliefs 22 can contribute to defining the recess or cavity C20. Additionally or alternatively, an inner face of wall 20b can have an inside circumference of the same geometry and characteristic size (diameter for example) as cap 100. For example, an outside diameter of the cap is substantially equal to the minimum inside diameter delimited at the cavity. Removable attachment may be provided via elastic, reversible deformation of cap 100 and/or via a shape complementary to the inside circumference. More generally, pot 20 has removable attachment means for fixing cap 100, for example by using outer side face F2 of cap 100 without rotational indexing. In some variants, a projection or non-planar bottom portion of the cap can engage with a complementary indentation formed in the bottom of cavity C20.

Bottom 20a of external pot 20 may or may not be circular, and is preferably annular to allow insertion of a cap of sufficient width, for example a cap having an outside diameter or maximum width greater than 40 or 45 mm.

Locking Portion and its Assembly on External Pot 20

In some embodiments, clamping component/element 5 is annular and may have a structure with a shoulder on an inner face F5, for example as in FIG. 1 or in FIGS. 2A-2B or FIG. 4, so as to be able to present:
- a surface portion S15, oriented downwards, positioned opposite/against mounting area S20;
- and another surface portion S5, also oriented downwards, which presses downwards a gripping edge of portion E, defining a contact area ZC.

Lower than the level of the shoulder which forms surface portion S15, component 5 may have an attachment area for clamping on the neck 24.

In general, the connection means provided in clamping component 5 for mounting on external container 20 are typically formed on the lower side of an inner side face F5, for example forming lugs R15 or reliefs/thread segments. The latter are possibly elongate. This makes it possible to configure a reusable portion of receptacle 1, formed by external container 20 and all or part of lid 30, as well as the connector/interface portion formed by clamping component 5 or by an interface cap 105, which enables the connection between lid 30 and attachment region RF of neck 24. This type of interface 5 or 105 here remains not exposed/visible in the assembled state of receptacle 1 when lid 30 is present, but visible if lid 30 is removed/detached from what covers neck 24.

Attachment region RF may include lugs 9 or stop elements which define the end of travel, possibly by providing such lugs as projecting parts formed on threads or reliefs for screwing. This ensures that rotation of the locking portion does not exceed a threshold such as 500 or 60°, in order to achieve locking with only a quarter turn for example. A notch area may further be used to make unscrewing more difficult at the start of rotation, due to the engagement of a local protruding relief provided on part 15 or 15'. This facilitates disconnection.

With reference to FIGS. 1 to 4, lid 30 has an external skirt 30b, joined to bottom 30a of the lid, which makes it possible to surround (and hide) one or several component parts 15, 15', 16 of locking portion 5. One part of locking portion 5 can be in the form of a ring for direct attachment to neck 24. Such a part 15 or 15' has a radial portion 15a or 150 provided with a radial inside contact area C15 and a lateral portion/wall 15b which extends downwards from a peripheral outer area of radial portion 15a, 150. An inverted L-shaped profile can be obtained for this annular part 15, 15'.

This may concern a first part 15 or 15' used to form an annular clamping component or element 15, 15' which rests on top of mounting area S20, possibly at a level coplanar with the axial contact provided (on this same area S20) for upper annular portion E of internal container 10. Another part 16 can cover the first part, without interacting with the external pot 20.

In a variant having a clamping component 105 which is removably carried by lid 30, as illustrated for example in FIGS. 6A to 6C, a cap format can be used, both for closing off the internal container in the absence of a lid 30 and for locking the internal container 10 in position when the lid is present. For this purpose, the cap which forms component 105 may be previously secured to lid 30 and the pivoting attachment of lid 30 on neck 24, around axis X' of pot 20, simultaneously results in the coupling of a skirt of the cap 105 on reliefs RC formed on upper portion E (which is held rotationally fixed relative to the pot, via the cooperation between anti-rotation means R20 and E20).

Cap 105 forms a locking component which, from the effect of attaching lid 30 to neck 14, screws onto ring 24 provided at the top of internal container 10 and presses against the latter from above.

Clamping an Upper Portion of the Internal Container by the Locking Portion

In some embodiments, locking portion 5, 105 can cover a radially outwardly projecting portion of internal container 10, without interfering with access to the compartment via the relatively wide opening 10d. For this purpose and to allow a compact configuration which allows mounting of the lid 30, the area for overlapping internal container 10 from above may be implemented by an annular radial portion or flange 16 in which the radial extension is less than or equal to the radial extension of the pot 2 around its own opening O. In this case, it is understood that the flange or piece 16 does not have any closure portion for closing off opening 10d. In some embodiment options using an annular structure, the locking portion 5 can have at least one relief or protruding projection 16d, protruding upwards relative to an upper face of radial portion 16a (as can be seen in particular in FIG. 2B), which can engage in the thickness of a seal or sealing layer J30 which covers and/or is integral with a comparatively more rigid bottom/closing portion of the lid 30.

FIGS. 2A-2B and FIG. 3B illustrate for example a double seat function that can be provided by area S20, against which can rest lower surface S15 of the radial portion 15a, 150, which belongs to the first part 15 or 15'. The contact area for surface S15 corresponds to an external portion of mounting area S20 not occupied by flange C of internal container 10.

In face F5 of component/portion 5, an internal shoulder may be formed corresponding to lower surface S15 of the radial portion 15a, while the bottom of face F5 carries reliefs R15, at lateral portion/wall 15b. Due to its position as close as possible to a flange C defining the maximum outside diameter of the internal container 10, the part 15, 15' allows centering the internal container 10 when the latter sits on mounting area S20. With this centering, the body of internal container 10, which extends downwards from upper annular portion E, can be kept radially spaced apart from the glass material of upper neck 24.

In the embodiments of FIGS. 1 to 4, part 15, 15' can be completely hidden by a flange consisting of a second part 16, also having an inverted L-shaped profile, in order to cover portions 15a (or 150) and 15b. For this purpose, second part 16 forms an annular flange provided with:

a radial portion 16a, for example substantially flat and perpendicular to axis X of the internal container 10, pressing directly or indirectly (via an interposed seal) against the top of flange C; and a lateral portion 16c including, on an annular outer face, an attachment region for attaching lid 30.

The attachment region (for the lid) formed on second part 16 can include reliefs r16 to prevent removal of lid 30, for example in the absence of rotation (unscrewing or rotation of less than 90°, for example by a quarter turn, to unlock a bayonet-type connection). Reliefs r16 are, of course, formed on an outer side face of the component 5 which ensures the clamping to immobilize internal container 10.

In the cases illustrated, second part 16 is superimposed on first part 15 or 15' and axially covers an upper face of the gripping edge/flange C of internal container 10, with or without the presence of an interposed annular seal J10 (non-limiting case of FIG. 2B). At least when such a seal J10 is provided, second part 16 can have a downward projection 16b, connected to the inner edge of radial portion 16a (opposite to the join between radial portion 16a and lateral portion 16c). Projection 16b can extend annularly to define a groove area, under radial portion 16a.

Annular seal J10 can then be received in this groove area. Projection 16b, protruding downwards from radial portion 16a, can limit the effect of inward lateral deformation of annular seal J10. Seal J10 can be centered by means of projection 16b when part 16 is then attached/assembled (possibly permanently) to part 15. Seal J10, after assembly of parts 15, 15, is sandwiched so as to extend radially between downward projection 16b and lateral portion 15b of first part 15 which engages the upper neck 24.

In FIGS. 2A and 2B, an inside diameter D15 (which can be extrapolated to any similar characteristic dimension of opening O1 defined by portion 15a) of first part 15 is illustrated which is slightly greater (almost equal) to the maximum outside diameter D10 of the internal container as defined by the upper portion E, which allows centering internal container 10. In some variants, part 15 can have internal radial tabs or discontinuities, not requiring a regular circumference (circular in these drawings). Portion 15a can have any suitable shape for the inside circumference C15, for example allowing contact with a guiding effect directly on flange C or rim portion of internal container 10.

With reference to the case illustrated in FIGS. 3A, 3B, and 4, this concept of a restricted dimension of opening O1 in part 15' is again found, such that surface S5 covers, from above, flange C whose outside diameter D10 exceeds diameter D15' of opening O1. Opening O2 defined by second part 16 can have an inside diameter that is less than or equal to diameter D15 or D15' of opening O1, thus allowing the entire radial portion 15a to be hidden/covered axially. Annular radial portion 16a which is part of second part 16 thus axially covers flange C and any possible intermediate part (s).

This can also apply to any embodiment with two superimposed parts: second part 16 which hides first part 15, 15' can also be formed of a more high-quality material in terms of covering and/or a more rigid material (compared to the material used for attachment to neck 24 and for centering flange C/gripping edge), for example aluminum.

In the example of FIGS. 2A and 2B, a component 5 is represented in two annular parts, with a seal J10 interposed axially between a sealing element or layer J30 integrated into lid 30, and flange C provided in upper annular portion E. In some variants, upper portion E of internal container 10 can be directly engaged by sealing layer J30 or a similar portion of lid 30, for example by providing the gripping edge (flange C) to be offset lower relative to the upper free edge of internal container 10.

FIGS. 3B and 4 thus illustrate a different design of component 5, leaving an upper end of internal container 10 uncovered, while allowing internal container 10 to be clamped and immobilized in its suspended position, with the distance between its bottom 10b and bottom 20a (typically a solid bottom/without opening) defining inside volume V.

With reference to FIG. 3A, the piece/part 15' can by itself implement the clamping and immobilization of internal container 5. Here the part 15', which is annular, has one or more contact reliefs 17, preferably deformable and with an elastic return effect, protruding radially inwards to rest directly against a circumferential area of flange C which is part of upper annular portion E of internal container 10.

Figure 3C:
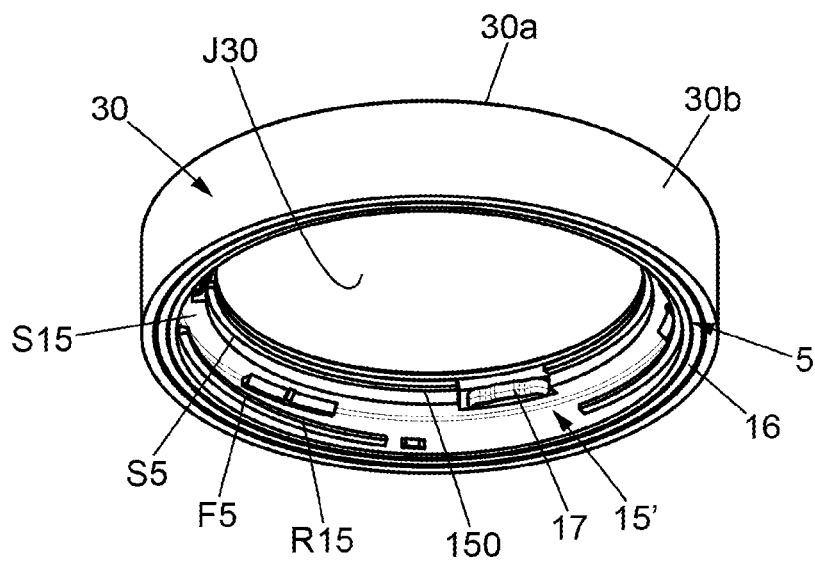
FIG. 3C is a perspective view from below of a head portion, complementary to the internal and external containers of the receptacle, including the locking portion shown in FIG. 3B, with the lid mounted/fixed on the flange.

Part 15' may have, on inner face F5, a double transition (substantially at 90°), for example with a double shoulder, as can be seen for example in FIG. 3C, such that surface S5 provided for the effect of pressing axially on flange C can be adjacent to circumferential area C15 which surrounds flange C. This interior circumferential area C15 is itself offset to be higher and more radially inward relative to the bottom of lateral portion 15b of part 15', which typically carries reliefs R15 engaging in a groove and/or on external reliefs of upper neck 24. Radial portion 150 may be extended radially inwards by one or more tabs 25 which are locally thin/of reduced height compared to the height of radial portion 150. Tab(s) 25 then cover the top of flange C while defining surface S5.

This type of implementation with two axial supports, resting on mounting area S20 and flange C, is also obtained in other embodiments including those illustrated. If necessary, the axial support on flange C can be supplemented or replaced by engaging on the outer edge/circumference of the flange when a gripping edge or reliefs RC are provided on such a flange C.

In all cases, part(s) 15, 15', 16 participating in the clamping of upper portion E can be arranged entirely outside of the inside volume V of external container 20.

Part 15, 15' and/or part 16 can have an annular shape around a central axis which typically can be coincident with the respective longitudinal axes X, X' of containers 10, 20, when receptacle 1 is in the assembled state. In longitudinal section view as can be seen in the non-limiting example of FIG. 2B, locking portion 5 has an inverted "L" profile allowing it to cover, both laterally and from above, the top of pot 20 and the portion E resting on the neck 24.

The locking portion can be put in place after internal container 10 is inserted into inside volume V, with utilization of mounting area/surface S20 provided on the top of neck 24. The insertion may be either complete/entire, for example using an internal shoulder of upper neck 24 to form mounting area S20; or partial, having an insertion portion introduced into inside volume V and constituting a cup body which extends under flange C or a similar edge/rim coming to rest from above on a free edge of upper neck 24. Axial support on the inside of the neck may also optionally be provided in options where internal container 10 protrudes beyond opening O of external pot 20.

Option with Cap of Internal Container Fitting into Another Portion of the Receptacle Referring now to FIGS. 6A to 6C, an example of a clamping component 105 will be described which allows preventing internal container 10 from withdrawing from external pot 20, when receptacle 1 is in the closed state with lid 30 attached to attachment region RF of the upper neck 24. Component 105 is for example in the form of a cap which functionally cooperates with lid 30 which is mounted on neck 24, here by magnetic coupling as well as, preferably, with anti-rotation immobilization.

This option also makes it possible to offer a refillable receptacle with locking of the removable internal container 10. The cap with interface function 105 is associated with internal container 10 so as to close its opening 10d while having an external shape which is complementary to an indentation formed internally in lid 30. For example, indentation 33 is defined by the external skirt of lid 30, possibly extending beyond an internal shoulder 34 provided in this skirt. In the lid 30, attachment reliefs 32 if present can be located under such a shoulder 34 which forms a transition for reducing the cross-section of the inner face of the lid 30.

In the fitted state, the cap 105 can fill indentation/female cavity 33 formed in the lid 30, so that cap 105 constitutes a plastic interface in a single piece that is integral in rotation with the lid 30, while remaining able to be attached around opening 10d of the internal container 10 suspended/mounted on neck 24 of the external pot 20.

Cap 105 has for example an outer side face whose cross-section is non-circular, which engages against the interior of lid 30 (inner face which can also be non-circular). More generally, cap 105 has a shape and dimensions adapted for a fixed engagement with lid 30, whereby lid 30 makes it possible to activate opening and closing the access to product 2 housed in the compartment.

The engagement on pot 20 by lid 30, with the effect of locking the sandwiched upper portion E (sandwiched between neck 24 and cap 105), can be achieved with a rotating action, simultaneously with cap 105. For this purposes, it is provided to rotationally fix/immobilize internal container 10 by a suitable arrangement of neck 24, typically with anti-rotation means R20 and E20 distributed between these two parts, which can be (very) rigid. Unlocking is allowed with a reverse rotation action, during which cap 105 follows the rotational movement to unscrew from portion E, for example at ring 14 or at a flange ring bearing reliefs RC as reflected in particular in FIG. 6A. The attachment portion for cap 105 is accessible, above the upper neck 24 of the pot 20.

In an option facilitating the operations of attaching and detaching cap 105 to/from lid 30, cap 105 has one or more magnetic attachment members M, opposing an axial removal of cap 105 from the bottom/mouth of indentation 33 when the cap is secured to lid 30. Magnetic attraction may be exerted between cap 105 and one or more complementary magnetic elements of lid 30. Optionally, magnetic members M incorporated into the cap are spread/distributed over a peripheral area of cap 105, for example hidden in lobes B5 or bulges formed as projections protruding radially outwards. Lobes B5 can serve to prevent rotation between cap 105 and the lid when cap 105 is housed in indentation 33.

When cap 105 is attached magnetically to lid 30 while occupying a recess therein, the cap can be entirely hidden by the lid. To allow the lid to be removed separately, it is possible to exert traction on internal container 10 beyond a threshold while keeping lid 30 attached, in the state where cap 105 is attached/locked on container 10. This can be sufficient to remove cap 105 from lid 30. Internal container 10 and the associated cap 105 can, as in the non-limiting case of FIG. 6A, form a travel-sized packaging unit, which can consist of only two parts (with sealing membrane 11, if there is such, of the type illustrated in FIG. 5 which may be provided with a tab (not shown), membrane 11 being present before first opening to access product 2).

Examples of Assembly and Disassembly

The use of a ferrule, locking ring, or similar clamping component allows for a compact design, with reliable assembly, while optimizing the use of glass. In particular, internal container 10 can be integrated into glass pot 20 with an axially protruding portion that is low in height (not very significant, for example less than or equal to 10 mm or 14 mm, typically less than 9 or 10 mm) or without a portion protruding beyond flange or edge 10r (in general in this description, the term flange can designate a continuous annular edge as well as an edge that is discontinuous/with slits). This has aesthetic advantages for integration into a glass pot, while allowing internal container 10 to be easily placed directly on external pot 20, typically with a centering effect.

Generally speaking, locking portion 5 or 105 can be fixed on the neck 24 by a rotation exerted in the same direction as a rotation to place the lid on such a locking portion, with lid 30 overlapping around locking portion 5 or 105 to prevent any grasping of locking portion 5 or 105 when using receptacle 1 to collect product 2 via opening 10d.

Referring to FIGS. 1, 2A, and 2B, after placing cup 10 on top of neck 24, on a portion of mounting surface/area S20 which is adjacent to an annular inner edge and distant from the annular outer edge, a ferrule is provided with two inseparable portions 15, 16, for example glued and/or clipped. In this method of assembly, a seal J10 may be placed at an annular area defined:

at the bottom by an upper edge or rim of the internal container 10;

laterally and externally, by the first part or ring 15, an annular portion of which is also placed on mounting surface/area S20—on an annular portion which is adjacent.

In practice, during consumption of product 2, locking portion 5 resulting from the assembly of parts 15, 16 can remain attached to the external pot 20. If container 10 must then be returned or discarded for recycling, it can be replaced after having rotationally unlocked the locking portion in order to detach it from glass neck 24. The internal container 10 can then be extracted from the reusable pot 20 by grasping the outer portion having a flange C.

With reference to FIGS. 3A to 4, assembly of the locking portion can be carried out before or after coupling part 15' to the periphery of upper annular portion E. As in the previous example, part 16 which forms the top of the locking portion can be arranged in any angular position relative to external pot 20, unlike part 15 or 15'. Here, it is possible to dispense with the seal between parts 15', 16 by arranging locking portion 5 solely around upper annular portion E, without axially covering from above its upper free edge/axial projection p10 which engages axially under lid 30, for example on sealing portion/element J30 of lid 30.

The same principle of rotationally fixing locking portion 5 on region RF can be applied, with portion 5 remaining secured to pot 20 (without detaching) during manipulations of the lid 30 which cooperates with part 16 constituting the annular covering flange.

Concerning first annular part 15 or 15' for attachment on the neck 24, for example as in the type illustrated in FIG. 3A, notches 18 or grooves may be formed in radial portion 15a, facilitating deformation effects when part 15, 15' comes to engage (from below) with reliefs or gripping edges of neck 24 while resting on the upwardly oriented mounting area S20, for adaptation to glass manufacturing tolerances. This can further facilitate detachment during disassembly in order to collect the internal container 10. Part 16 may be thinner than part 15 or 15', which makes it possible to reduce the total height of locking portion 5.

In the option illustrated in FIG. 6C, it is also understood that cap 105 can be made of less rigid material than lid 30. The skirt portion of lid 30 which attaches on neck 24 can be thinner than the portion surrounding cap 105. The axial distance or the height of the spacing can be lower between attachment region RF with reliefs 123 formed on the neck, and the connection portion with reliefs RC, for example less than 15 mm, more preferably less than or equal to 9 mm, in order to allow the use of a lid 30 that is compact in height, typically wider than high.

In mounted state of the cap 105 in recess/indentation 33, the direction that cap 105 is screwed onto annular portion E is the same as the pivoting direction (screwing, bayonet connection, or similar) for engaging attachment reliefs 32 on and/or under complementary reliefs 123. The shape of indentation 33 allows rotational indexing between cap 105 and lid 30, while anti-rotation means E20 and R20 also play a role in obtaining a predetermined angular position of internal container 10 relative to pot 20, which makes it possible to ensure that the positions of reliefs 52 and 32 are compatible with an attachment coaction, on the corresponding lateral attachment areas (E and RF respectively) of superimposed containers 10 and 20, during the common rotational movement, for example in a rotation of less than 90°.

It should be apparent to those skilled in the art that this invention permits embodiments in many other specific forms without departing from the scope of the invention as claimed.

The invention claimed is:

1. A refillable receptacle for cosmetic product, comprising:
   an external covering pot made of glass, including a side wall extending around a longitudinal axis and an upper neck defining an axial opening for accessing an inside volume of the pot;
   a removable internal container made of rigid inert inorganic material created as one piece and intended to be inserted into the inside volume through the axial opening, defining a storage compartment for the cosmetic product;
   a lid configured to occupy a closed position which allows closing off the axial opening; and
   an annular clamping element for clamping from above, constituting or being part of a locking portion which is detachably fixed to the upper neck to prevent removal of the internal container at least in the closed position,
      wherein the locking portion, secured to the pot, is configured to axially immobilize the internal container which is engaged on the upper neck by seating with direct contact on a mounting area that is at an uppermost part of the upper neck, the annular clamping element being adapted to cover axially, from above, an upper annular portion of the internal container so that said upper annular portion of the internal container is axially sandwiched between a glass edge or rim forming all or part of the mounting area provided on the upper neck and a radial portion of the annular clamping element,
   wherein the annular clamping element constitutes the locking portion, which is separate from the lid and has an annular shape to define an opening for accessing the storage compartment when the lid is absent,
   wherein the annular clamping element comprises a first part having an annular radial portion which extends around the longitudinal axis and has an inside diameter resting directly against the uppermost part of the upper neck from above, presenting an inner face which faces a flange of the internal container, the flange being formed in said upper annular portion of the internal container,
   wherein the upper annular portion defines a maximum outside diameter of the internal container, which is lower than the inside diameter of the first part,
   wherein the radial portion of the annular clamping element axially contacts above the annular radial portion of the first part,
   and wherein the lid is removably fixed in an annular attachment region formed on at least one among the annular clamping element and the upper neck.

2. The refillable receptacle according to claim 1, wherein the lid is configured to be locked to prevent the lid's rotation about the longitudinal axis in the annular attachment region, while surrounding a part of the annular clamping element which rests on top on said mounting area, said part being interposed radially between:
   said upper annular portion of the internal container, and
   a skirt of the lid,
      such that said part allows centering the internal container when the internal container is sitting on the mounting area, while maintaining a body of the internal container, which extends downwards from the upper annular portion, radially spaced apart from the glass material of the upper neck.

3. The refillable receptacle according to claim 2, comprising a sealing member which axially contacts above the upper annular portion and is against said part of the annular clamping element.

4. The refillable receptacle according to claim 1, wherein the annular clamping element further comprises:
   a second part forming an annular outer flange provided with said radial portion and a lateral portion including an attachment region for attaching the lid, the second part being superimposed on the first part and axially covering:
      an upper face of said flange of the internal container, and an annular seal resting axially on the upper annular portion.

5. The refillable receptacle according to claim 4,
   wherein the annular seal rests on the top of a delimiting edge provided in the upper annular portion of the internal container in order to define a single axial opening for accessing the compartment,
   and wherein the second part has a downward projection which extends annularly to define a groove area in which the annular seal is received, the annular seal extending radially between the downward projection and a lateral portion of the first part which surrounds the upper neck.

6. The refillable receptacle according to claim 5, wherein the downward projection is a sealing lip formed as one piece with the annular outer flange.

7. The refillable receptacle according to claim 1,
   wherein the external pot is made as a single-piece and the internal container is a single-piece cup, each made of glass,
   and wherein the annular clamping element is fixedly mounted on the upper neck of the external pot and configured to maintain a radial spacing, between the inserted portion of the internal container and the external pot, presenting an inside circumference for contact against and guidance of said flange.

8. The refillable receptacle according to claim 1, wherein the annular clamping element has one or more contact reliefs, deformable and with an elastic return effect, projecting radially inwards so as to rest directly against a circumferential area of a flange that is part of the upper annular portion of the internal container, said flange being sandwiched axially between the mounting area provided on the upper neck and the annular radial portion of the annular clamping element.

9. The refillable receptacle according to claim 1, wherein the locking portion is adapted to press the internal container axially downwards and has an external skirt which allows locking a suspended position of the internal container inserted in the external pot, during a relative rotational movement of the locking portion with respect to the external pot when the external skirt is surrounding the upper neck.

10. The refillable receptacle according to claim 1,
    wherein the internal container includes an attachment ring provided with reliefs, the receptacle further comprising:
    a cap adapted to selectively close off the single opening of the internal container, by engaging with the upper annular portion of the internal container at the reliefs which extend above the mounting area when the internal container is in an insertion configuration in the inside volume; and
    in the external pot, opposite to the upper neck, a recess or cavity which allows accommodating the cap.

11. The refillable receptacle according to claim 1, wherein the locking portion is removable relative to the external pot and is fixed to the external pot, defining a radially interior groove or attachment area adjacent to the upper neck, the internal container, which is provided with a flange or edge in said upper annular portion, being configured so that the flange or edge fills the groove or attachment area.

12. The refillable receptacle according to claim 1, wherein the internal container cooperates with a cap in a nomadic use requiring neither the external pot nor the lid, the cap being accommodated in a recess or cavity of the external pot, the recess or cavity having a mouth opening axially opposite the axial opening, so that the cap is:
    removably mountable on the internal container, above said flange of the internal container, on the one hand, and
    removably mountable on the external pot, in the recess or cavity, on the other hand.

13. A method of assembly for obtaining the receptacle according to claim 1, by mounting an internal container provided with a flange and formed as one piece, made of rigid inert inorganic material, in an external pot made of glass, the method successively comprising the following:
    inserting the internal container into an inside volume of the external pot through a longitudinal opening of the external pot, so that the internal container is positioned with direct contact at the flange on a mounting area that is an uppermost part of an upper neck of the external pot;
    coupling a locking portion around the upper neck of the external pot, by removable attachment means, so that in the fastened state of the locking portion, an annular clamping element which is part of a locking portion and which is fixed relative to the upper neck clamps from above an upper annular portion of the internal container with a downward axial pressure against the mounting area so as to prevent removal of the internal container, the flange being formed in said upper annular portion of the internal container:
wherein after a mounting by relative rotation with respect to the external pot, a lid allows obtaining a closed position of the receptacle by surrounding the annular element, whereby said upper annular portion of the internal container is axially sandwiched between a glass edge or rim forming all or part of the mounting area provided on the upper neck, and a radial portion of the annular clamping element which is distinct from the lid,
wherein the annular clamping element, which constitutes the locking portion, is provided:
    with an annular shape to define an opening for accessing the storage compartment when the lid is absent,
    with a first part having an annular radial portion which extends around the longitudinal axis and has an inside diameter, resting directly against the uppermost part of the upper neck from above, presenting an inner face which faces the flange of the internal container,
wherein the upper annular portion defines a maximum outside diameter of the internal container, which is lower than the inside diameter of the first part,
and wherein the radial portion of the annular clamping element axially contacts above the annular radial portion of the first part.

14. The refillable receptacle according to claim 1, wherein the internal container is seating on the mounting area to cover an annular surface adjacent to an annular inner edge of the upper neck without covering an annular outer edge of the upper neck, the annular clamping element axially covering the annular outer edge.

15. The refillable receptacle according to claim 2, wherein the part of the annular clamping element rests on top of said mounting area at a level that is coplanar with the upper annular portion of the internal container.

16. The method of assembly according to claim 13, further comprising:
   forming an annular outer flange of the annular clamping element, including said radial portion a lateral portion including an attachment region for attaching the lid, in a second part of the annular clamping element; and
   superimposing the second part on the first part to obtain the locking portion and lock a suspended position of the internal container inserted in the external pot, by having the locking portion pressing the internal container axially downwards, while also providing a centering of the internal container thanks to the first part whose inner face is facing the flange of the internal container so that radial contacts of the internal container against interior face formed by the glass of the neck are prevented.

* * * * *